United States Patent
Lee et al.

(10) Patent No.: US 7,938,939 B2
(45) Date of Patent: May 10, 2011

(54) HYDROGEN GENERATING APPARATUS AND FUEL CELL GENERATION SYSTEM

(75) Inventors: Eon Soo Lee, Gyeongsangbuk-do (KR); Jae-Hyoung Gil, Seoul (KR); Craig Miesse, Seoul (KR); Jae-Hyuk Jang, Seoul (KR); Kyoung-Soo Chae, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 277 days.

(21) Appl. No.: 12/418,199

(22) Filed: Apr. 3, 2009

(65) Prior Publication Data

US 2009/0263693 A1 Oct. 22, 2009

(30) Foreign Application Priority Data

Apr. 18, 2008 (KR) .................. 10-2008-0036329

(51) Int. Cl.
 *C25B 9/06* (2006.01)
(52) U.S. Cl. .................. 204/278.5; 204/275.1; 204/269; 204/270; 204/256; 204/266; 204/262; 204/274; 429/454; 429/418
(58) Field of Classification Search .......... 204/256, 204/266, 269, 270, 275.1, 278, 262, 274; 429/454, 418
See application file for complete search history.

(56) References Cited

U.S. PATENT DOCUMENTS

| | | | |
|---|---|---|---|
| 6,569,298 B2 * | 5/2003 | Merida-Donis | 204/263 |
| 7,056,428 B2 * | 6/2006 | Narayanan et al. | 205/637 |
| 2001/0009223 A1 * | 7/2001 | Lee et al. | 204/269 |
| 2002/0051898 A1 * | 5/2002 | Moulthrop et al. | 429/17 |
| 2002/0070123 A1 * | 6/2002 | Andrews et al. | 205/626 |
| 2004/0013918 A1 * | 1/2004 | Merida-Donis | 429/21 |
| 2007/0051633 A1 * | 3/2007 | Meyer et al. | 205/108 |
| 2007/0111048 A1 * | 5/2007 | Rackey et al. | 429/17 |
| 2008/0047502 A1 * | 2/2008 | Morse | 123/3 |
| 2008/0289955 A1 * | 11/2008 | Balestrino et al. | 204/274 |
| 2008/0314741 A1 * | 12/2008 | Balestrino et al. | 204/274 |

FOREIGN PATENT DOCUMENTS

| | | |
|---|---|---|
| KR | 2000-061954 | 10/2000 |
| KR | 10-078009 | 11/2007 |

OTHER PUBLICATIONS

Korean Office Action, with partial English translation, issued in Korean Patent Application No. 10-2008-0036329, mailed May 14, 2010.

* cited by examiner

*Primary Examiner* — Bruce F Bell
(74) *Attorney, Agent, or Firm* — McDermott Will & Emery LLP (57) ABSTRACT

A hydrogen generating apparatus and a fuel cell power generation system having the hydrogen generating apparatus are disclosed. The hydrogen generating apparatus can include an electrolyte bath configured to contain an electrolyte solution, an anode placed inside the electrolyte bath and configured to generate electrons, a cathode placed inside the electrolyte bath and configured to receive the electrons from the anode to generate hydrogen, a condensation plate disposed on a transfer path of the hydrogen such that moisture carried in the hydrogen is condensed and the hydrogen is separated, and a heat exchanger configured to cool down the condensation plate heated by the moisture carried in the hydrogen. The hydrogen generating apparatus of the present invention can increase the efficiency of hydrogen generation by removing the moisture carried in the hydrogen while generating the hydrogen and reusing the moisture circulated through the electrolyte solution.

30 Claims, 6 Drawing Sheets

HYDROGEN GENERATING APPARATUS AND FUEL CELL GENERATION SYSTEM

CROSS-REFERENCE TO RELATED APPLICATIONS

This application claims the benefit of Korean Patent Application No. 10-2008-0036329 filed with the Korean Intellectual Property Office on Apr. 18, 2008, the disclosure of which is incorporated herein by reference in its entirety.

BACKGROUND

1. Technical Field

The present invention relates to a hydrogen generating apparatus and a fuel cell generation system.

2. Description of the Related Art

A fuel cell is an apparatus that converts the chemical energies of fuel (hydrogen, LNG, LPG, etc.) and air directly into electricity and heat, by means of electrochemical reactions. In contrast to conventional power generation technologies, which employ the processes of burning fuel, generating vapor, driving turbines, and driving power generators, the utilization of fuel cells does not entail combustion processes. As such, the fuel cell is a relatively new technology for generating power that offers high efficiency and few environmental problems.

Methods used in generating hydrogen for a fuel cell can mainly include a method of utilizing the oxidation of aluminum, a method of utilizing the hydrolysis of metal borohydrides, and a method of utilizing reactions on metal electrodes. Among these, the method of using metal electrodes efficiently regulates the rate of hydrogen generation. This is a method in which the electrons obtained when magnesium in the electrode is ionized to $Mg^{2+}$ ions are moved through a wire and connected to another metal object, where hydrogen is generated by the dissociation of water. The amount of hydrogen generated can be regulated, as it is related to the distance between electrodes and the size of the electrodes.

However, since the chemical reactions, i.e. exothermic reactions, here produce a lot of heat as well as the generated hydrogen carry a lot of vapor, the efficiency of the use of the water and the amount of hydrogen generated can be dramatically decreased. For that reason, when storing the hydrogen in the hydrogen generating apparatus, the efficiency of storage can be dramatically decreased.

SUMMARY

An aspect of the invention provides a hydrogen generating apparatus and a fuel cell generation system, which remove moisture carried in hydrogen while generating hydrogen and thus increase the efficiency of hydrogen generation.

Another aspect of the invention provides a hydrogen generating apparatus. The hydrogen generating apparatus can include an electrolyte bath configured to contain an electrolyte solution, an anode placed inside the electrolyte bath and configured to generate electrons, a cathode placed inside the electrolyte bath and configured to receive the electrons from the anode to generate hydrogen, a condensation plate disposed on a transfer path of the hydrogen such that moisture carried in the hydrogen is condensed and the hydrogen is separated, and a heat exchanger configured to cool down the condensation plate heated by the moisture carried in the hydrogen.

Certain embodiments of the invention may include one or more of the following features.

The condensation plate can be disposed such that the hydrogen is blocked, and a through-hole is formed on the condensation plate such that the hydrogen passes through the through-hole.

The condensation plate can have a porous structure.

The condensation plate can be disposed such that the condensed moisture is circulated through the electrolyte bath.

The condensation plate can be disposed with an inclination such that the condensed moisture flows down to the electrolyte bath. The condensation plate can be disposed with an inclination to a center from both sides of the condensation plate such that the condensed moisture flows down to a center of the electrolyte bath.

A plurality of the condensation plates can be disposed.

The plurality of condensation plates can have different thicknesses from one another and be disposed such that the condensation plates are thinner along the transfer path of the hydrogen.

The plurality of condensation plates can be disposed such that the hydrogen is blocked, and a through-hole is formed on each of the condensation plates such that the hydrogen passes through the condensation plates.

The size of the through-hole on each of the plurality of condensation plates is different from one another, and the condensation plates are disposed such that the size of the through-hole on each of the plurality of condensation plates becomes smaller along the transfer path of the hydrogen.

A surface of the condensation plate can be coated with moisture repellent.

The condensation plate can be made of a material comprising a thermal conduction substance.

The condensation plate can be made of a material including at least one selected from a group consisting of carbon (C), copper (Cu), and aluminum (Al).

The hydrogen generating apparatus can further include an absorption layer disposed after the condensation plate along the transfer path of the hydrogen such that remaining moisture carried in the hydrogen is absorbed. The hydrogen generating apparatus can further include a wheel coupled to the electrolyte bath such that the electrolyte bath is easily moved, in which the wheel is capable of being rolled.

Still another aspect of the invention provides a fuel cell power generation system. The fuel cell power generation system can include an electrolyte bath configured to contain an electrolyte solution, an anode placed inside the electrolyte bath and configured to generate electrons, a cathode placed inside the electrolyte bath and configured to receive the electrons from the anode to generate hydrogen, a condensation plate disposed on a transfer path of the hydrogen such that moisture carried in the hydrogen is condensed and the hydrogen is separated, a heat exchanger configured to cool down the condensation plate heated by the moisture carried in the hydrogen, and a fuel cell configured to produce electrical energy by converting chemical energy of the hydrogen produced at the cathode.

Certain embodiments of the invention may include one or more of the following features.

The condensation plates can be positioned to block the hydrogen and can have through-holes formed therein to allow the hydrogen to pass.

The condensation plate can have a porous structure.

The condensation plate can be disposed such that the condensed moisture is circulated through the electrolyte bath.

The condensation plate can be disposed with an inclination such that the condensed moisture flows down to the electrolyte bath. The condensation plate can be disposed with an inclination to a center from both sides of the condensation plate such that the condensed moisture flows down to a center of the electrolyte bath.

A plurality of the condensation plates can be disposed.

The plurality of condensation plates can have different thicknesses from one another and be disposed such that the condensation plates are thinner along the transfer path of the hydrogen.

The plurality of condensation plates can be disposed such that the hydrogen is blocked, and a through-hole is formed on each of the condensation plates such that the hydrogen passes through the condensation plates.

The size of the through-hole on each of the plurality of condensation plates is different from one another, and the condensation plates are disposed such that the size of the through-hole on each of the plurality of condensation plates becomes smaller along the transfer path of the hydrogen.

A surface of the condensation plate can be coated with moisture repellent.

The condensation plate can be made of a material comprising a thermal conduction substance.

The condensation plate can be made of a material including at least one selected from a group consisting of carbon (C), copper (Cu), and aluminum (Al).

The hydrogen generating apparatus can further include an absorption layer disposed after the condensation plate along the transfer path of the hydrogen such that remaining moisture carried in the hydrogen is absorbed. The hydrogen generating apparatus can further include a wheel coupled to the electrolyte bath such that the electrolyte bath is easily moved, in which the wheel is capable of being rolled.

Additional aspects and advantages of the present invention will be set forth in part in the description which follows, and in part will be obvious from the description, or can be learned by practice of the invention.

DETAILED DESCRIPTION

A hydrogen generating apparatus and a fuel cell power generation system equipped with the hydrogen generating apparatus according to certain embodiments of the present invention will be described below in more detail with reference to the accompanying drawings. Those components that are the same or are in correspondence are rendered the same reference numeral regardless of the figure number, and redundant explanations are omitted.

It is to be noted that the coupling of components encompasses not only the direct physical engaging between the components, but also the engaging of the components with another element interposed in-between such that the components are in contact with the other element.

Figure 1:
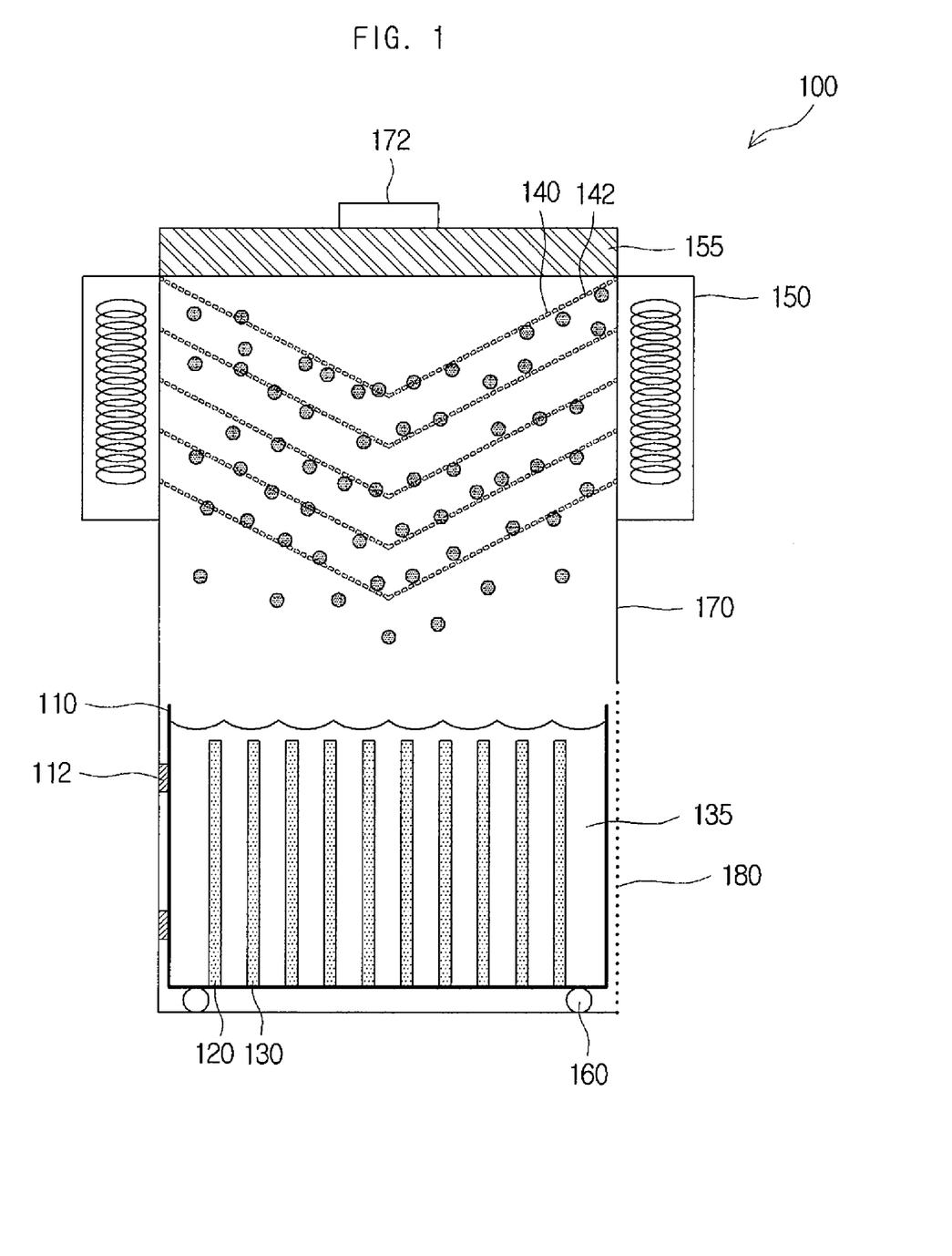
FIGS. 1 to 3 are cross-sectional views illustrating a hydrogen generating apparatus according to an aspect of the present invention.
Figure 2:
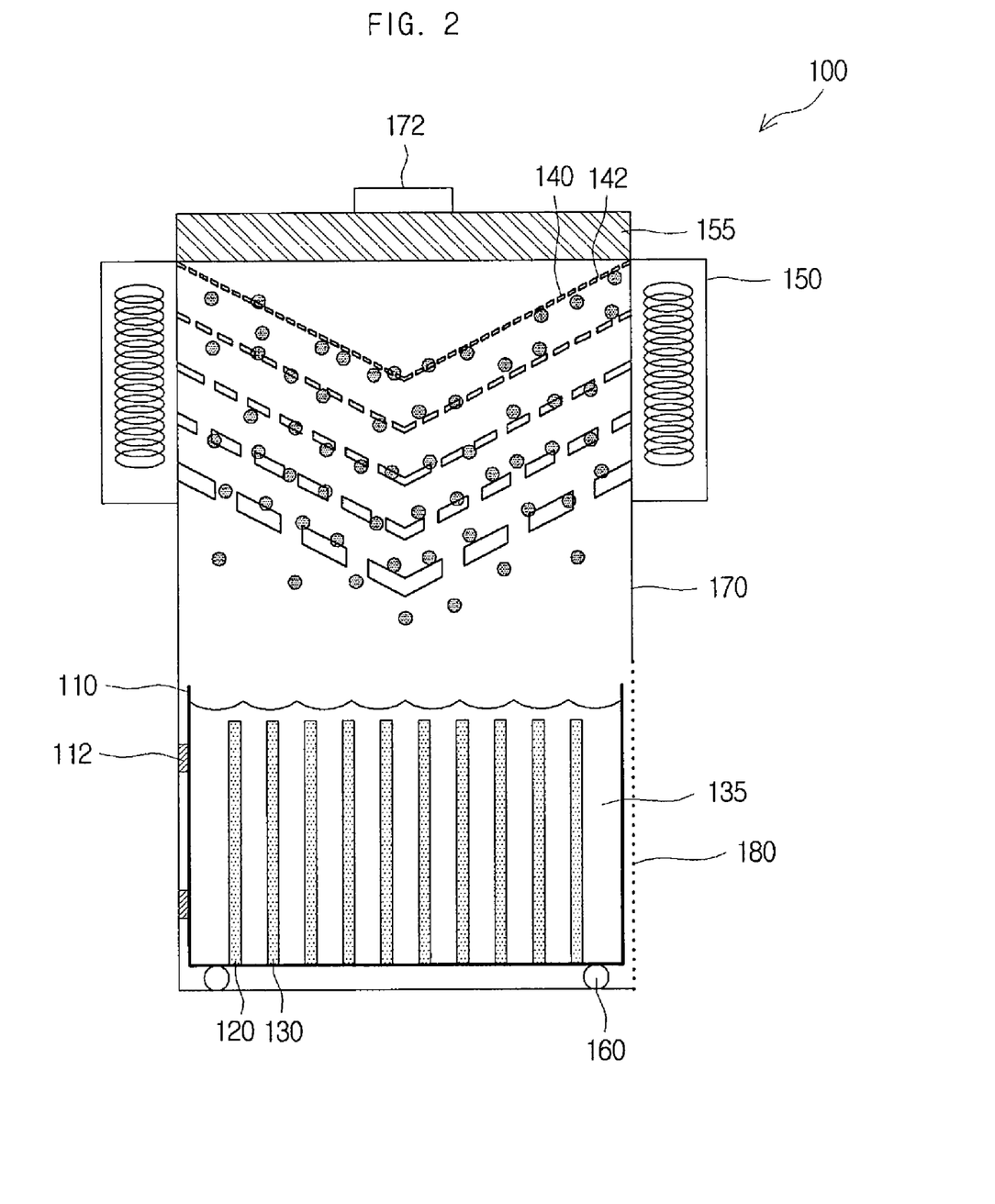
Figure 3:
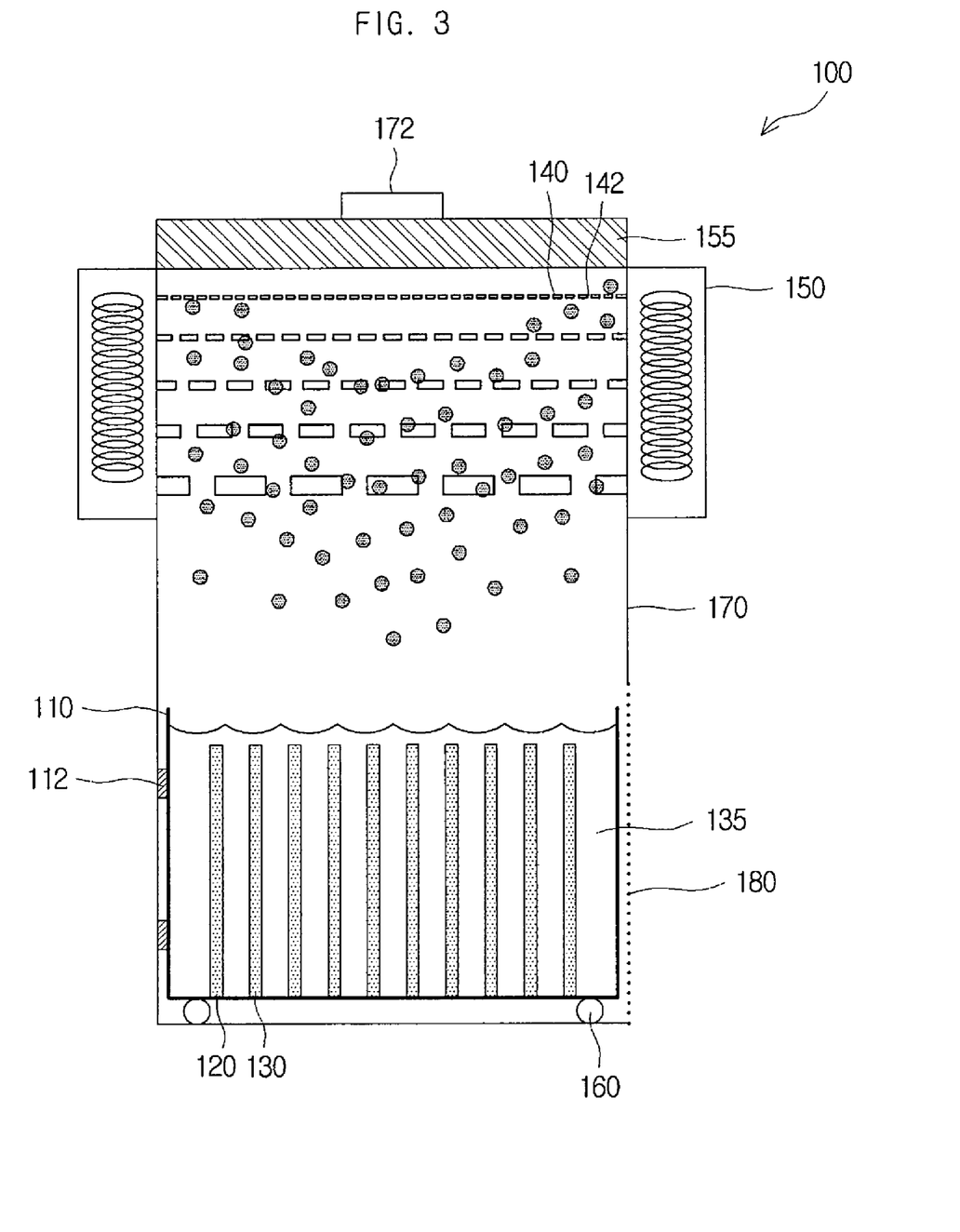
Figure 4:
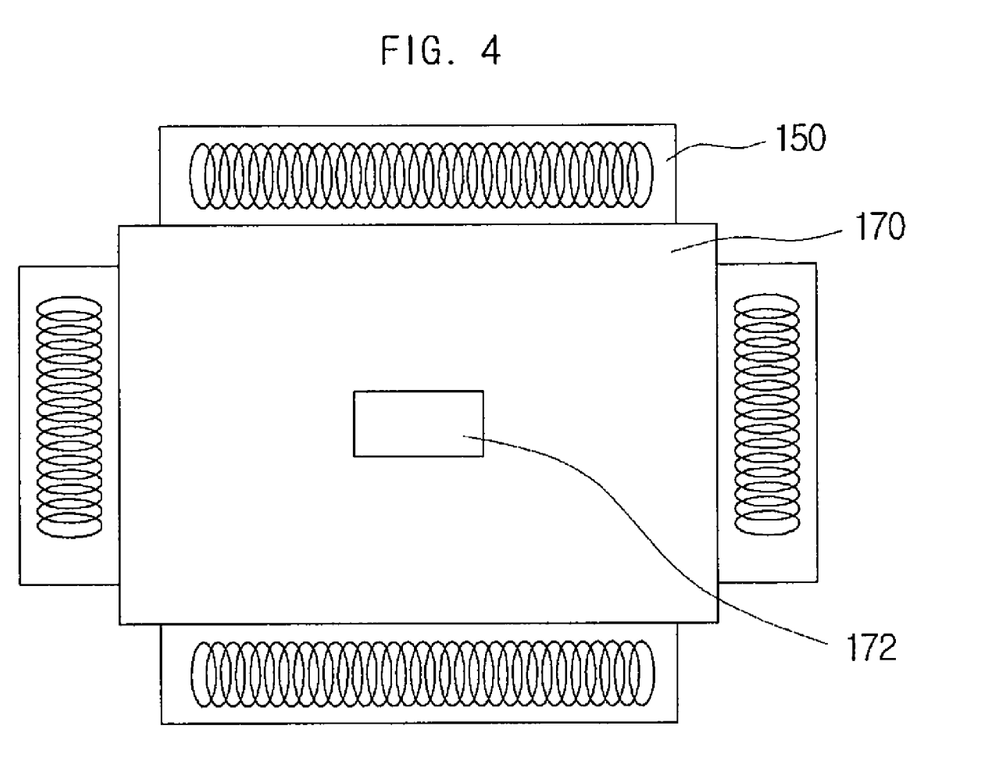
FIGS. 4 and 5 are plane views illustrating a hydrogen generating apparatus according to an aspect of the present invention.
Figure 5:
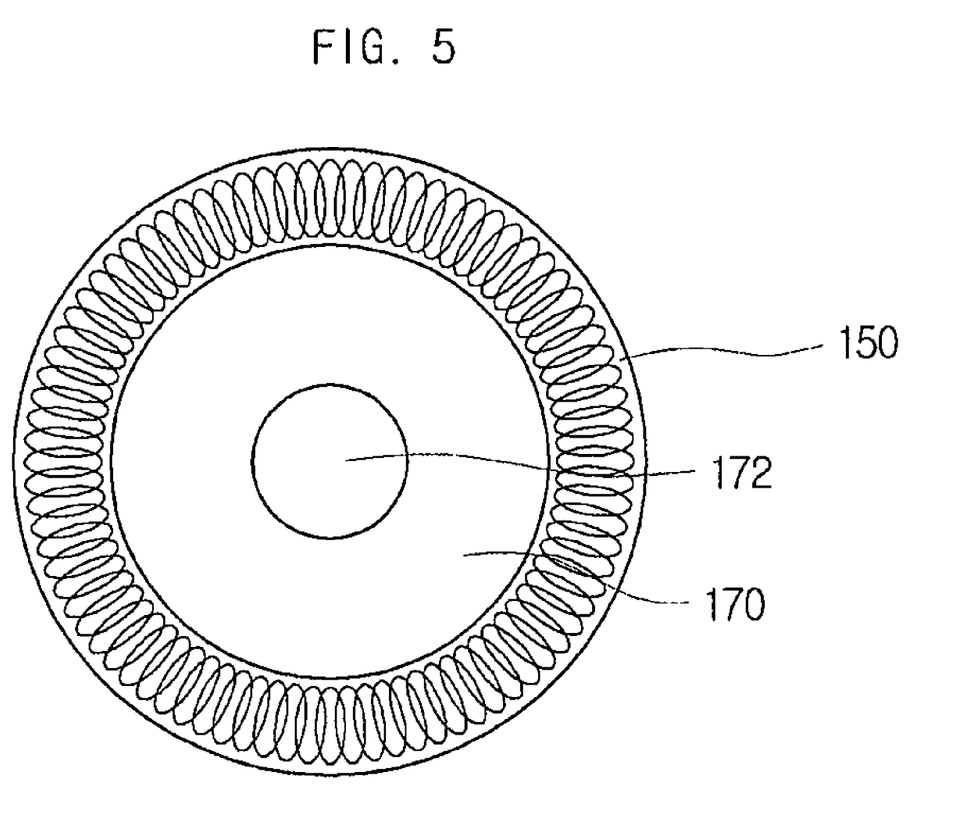

FIGS. 1 to 3 are cross-sectional views illustrating a hydrogen generating apparatus according to an aspect of the present invention, and FIGS. 4 and 5 are plane views illustrating a hydrogen generating apparatus according to an aspect of the present invention. Illustrated in FIGS. 1 to 5 are a hydrogen generating apparatus 100, an electrolyte bath 110, a connection-terminal 112, an anode 120, a cathode 130, an electrolyte solution 135, a condensation plate 140, a through-hole 142, a heat exchanger 150, an absorption layer 155, a wheel 160, a housing 170, a hydrogen outlet 172, and a cover 180.

The present embodiment presents a hydrogen generating apparatus 100 that can increase the efficiency of hydrogen generation, in which a condensation plate 140 is disposed on a transfer path of hydrogen such that moisture carried in the hydrogen can be removed and reused through an electrolyte bath 110.

A housing 170 can have a hydrogen outlet 172 formed on the top of the housing 170 such that the hydrogen can be discharged, an aperture can be formed at the bottom of the housing 170 such that the electrolyte bath 110 can be replaced, and a cover 180 can be coupled to one side of the housing 170 such that the aperture can be opened and closed.

Also, an absorption layer 155 can be disposed adjacent to the hydrogen outlet 172 in the housing 170, multiple condensation plates 140 can be disposed under the bottom of the absorption layer, and a heat exchanger 150, which removes heat generated from the condensation plate 140, can be formed on both sides of the housing 170. In addition, a control part can be coupled to the housing to control the hydrogen generation of the hydrogen generating apparatus 100.

The electrolyte bath 110 can contain an electrolyte solution 135 that releases hydrogen through a cracking reaction. Also, an anode 120 and a cathode 130 can be placed inside the electrolyte bath 110, and a reaction of generating hydrogen can be occurred by the electrolyte solution 135 contained inside the electrolyte bath 110.

In this case, a wheel 160 being capable of being rolled is coupled to the electrolyte bath 110 such that the electrolyte bath can be easily moved. Therefore, when the hydrogen generation comes to a halt in the electrolyte bath 110, the cover 180 of the housing 170 can be opened, the electrolyte bath 110 can be replaced by pushing or pulling the worn-out electrolyte bath 110 using the wheels 160, and thus the hydrogen generation continues.

Also, a connection terminal 112 can be formed on one side of the electrolyte bath 110 such that the connection terminal 112 can be electrically connected to a control part coupled to the housing 170,. The connection-terminals 112 can be electrically connected to the anode 120 and the cathode 130 placed inside the electrolyte bath 110, and the control part can control a flow of electricity between the anode 120 and the cathode 130 such that an amount of the hydrogen generated can be controlled. A compound such as LiCl, KCl, NaCl, $KNO_3$, $NaNO_3$, $CaCl_2$, $MgCl_2$, $K_2SO_4$, $Na_2SO_4$, $MgSO_4$, AgCl, etc., can be used in the electrolyte solution 135, and the electrolyte solution 135 can contain hydrogen ions.

The anode 120 is an active electrode, which can generated electrons inside the electrolyte bath 110. The anode 120 can be made of magnesium (Mg), for example, and due to the difference in ionization tendency between the anode 120 and hydrogen, the anode 120 can release electrons into the electrolyte solution 135 and be oxidized into magnesium ions ($Mg^{2+}$).

The electrons generated thus can travel to the cathode 130. Therefore, the anode 120 get dissipated while generating electrons and can be replaced by a new one as time goes by. Also, as it will be described later, the anode 120 can be made of a metal having a greater tendency of ionizing than the material used for the cathode 130.

The cathode 130 is an inactive electrode, which is not expended, unlike the anode 120, and thus can be implemented with a lower thickness than the anode 120. The cathode 130 can be positioned inside the electrolyte bath 110 and receive the electrons generated at the anode 120 to generate hydrogen.

The cathode 130 can be made of stainless steel or aluminum, for example, and react with the electrons to generate hydrogen. That is, the chemical reaction at the cathode 130 involves the electrolyte solution 135 being dissociated, after receiving the electrons from the anode 120, to form hydrogen at the cathode 130. The reactions at the anode 120 and the cathode 130 can be represented by the following Reaction Scheme 1.

[Reaction Scheme 1]

Anode 120: $Mg \rightarrow Mg^{2+} + 2e^-$

Cathode 130: $2H_2O + 2e^- \rightarrow H_2 + 2(OH)^-$

Overall Reaction: $Mg + 2H_2O \rightarrow Mg(OH)_2 + H_2$

The condensation plate 140 can be disposed on a transfer path of the hydrogen such that moisture carried in the hydrogen is condensed and the hydrogen is separated. That is, since a chemical reaction between the anode 120 and the cathode 130 is an exothermic reaction, the temperature of the electrolyte solution 135, for example, can rise up to 70 to 80 degrees Celsius so that the generated hydrogen can carry a lot of moisture. In order to remove the moisture, the condensation plate 140 can be used. In other words, the condensation plate 140 is disposed on the top of the electrolyte bath 110 such that the moisture carried in the hydrogen can be condensed and removed, and thus the humidity of the hydrogen generated at the electrolyte bath 110 can be dramatically dropped. Also, the condensation plate 140 can be disposed on a transfer path of the hydrogen such that the hydrogen is blocked, and a through-hole 142 is formed on the condensation plate such that the hydrogen passes through the through-hole. In other words, the condensation plates 140 can be disposed on the top of the electrolyte bath 110 such that the hydrogen is blocked, and have the through-hole 142 formed on the condensation plate such that the hydrogen passes through the through-hole. Therefore, the moisture carried in the hydrogen can be effectively condensed since the hydrogen generated at the electrolyte bath 110 is efficiently in contact with the condensation plates 140. The condensation plate 140 of the hydrogen generating apparatus 100 according to the present embodiment, as illustrated in FIG. 1 and FIG. 2, can be disposed with an inclination or parallel as illustrated in FIG. 3. As illustrated in FIG. 3, it is apparent that various structures, in which the hydrogen is blocked on a transfer path of the hydrogen, can encompass a wide range of embodiments being possible by those with ordinary knowledge in the field of art to which the present invention belongs without departing from the scope of rights of the present invention.

Here, the condensation plate 140 can have a porous structure so that areas in contact with the hydrogen generated at the electrolyte bath 110 can be greatly increased, and thus the efficacy of condensation can be increased. Meanwhile, the condensation plate 140 can be disposed such that the condensed moisture is circulated through the electrolyte bath 110. That is, the condensation plate 140 can be disposed with an inclination such that the condensed moisture flows down to the electrolyte bath 110. Consequently, the efficacy of hydrogen generation of the hydrogen generating apparatus 100 can be increased since the moisture carried in the hydrogen is reused and an amount of the electrolyte solution 135 having been lost while generating hydrogen is decreased. In this case, the condensation plate 140 can be disposed with an inclination to a center from both sides of the condensation plated such that the condensed moisture flows down to a center of the electrolyte bath 110. In other words, the condensation plate 140 can be shaped in 'V' form. Consequently, the moisture condensed on a surface of the condensation plate 140 can flow down to the electrolyte bath 110 without any loss.

Also, a plurality of condensation plates 140 can be disposed. In other words, the plurality of condensation plates 140 are stacked over one another so that they can be kept separate from one another. Therefore, the efficacy of condensation can be increased by filtering the moisture carried in the hydrogen through the condensation plates several times. In this case, as illustrated in FIG. 2, the plurality of condensation plates can have different thicknesses from one another and be disposed such that the condensation plates are thinner along the transfer path of the hydrogen. In other words, the thicker condensation plate 140 can be disposed at the bottom of the transfer path of the hydrogen, where the moisture content of the hydrogen is likely higher, Here, the moisture can be effectively condensed by absorbing heat generated from the moisture. For that reason, the thickness of the condensation plates 140 become gradually thinner along the transfer path of the hydrogen, and thus the moisture carried in the hydrogen can be effectively condensed.

In addition, as illustrated in FIG. 2, the size of the through-hole on each of the plurality of condensation plates 140 can be different from one another, and the condensation plates are disposed such that the size of the through-hole on each of the plurality of condensation plates becomes smaller along the transfer path of the hydtogen. In other words, the plurality of condensation plates 140 are disposed along the transfer path of the hydrogen, where the size of the through-holes becomessmaller such that the through-holes of the condensation plate 140 disposed at the bottom are not blocked by the moisture flowing down from the condensation plate 140 disposed at the top. Thus, the moisture carried in the hydrogen can be effectively condensed, and the condensed moisture can be reused again by circulating the moisture in the electrolyte bath 110.

Meanwhile, the condensation plate 140 can be made of a material comprising a thermal conduction substance, e.g. carbon (C), copper (Cu), aluminum (Al), or a composition of these, and thus can efficiently condense the moisture carried in the hydrogen by absorbing heat.

Here, a surface of the condensation plate 140 can be coated with moisture repellent such that the moisture absorption into the condensation plates 140 is prevented, and the moisture carried in the hydrogen is continually condensed and removed. Therefore, the efficacy of circulation of the condensed moisture in the electrolyte bath 110 can be increased more efficiently.

The heat exchanger 150 can cool down the condensation plate 140 heated by the moisture carried in the hydrogen. In other words, the condensation plate 140 can be heated by the moisture while the moisture is condensed. In case the temperature of the condensation plate 140 rises, the efficacy of condensing moisture can decrease. For that reason, the moisture can be effectively condensed by dropping the temperature of the condensation plate 140 using the heat exchanger 150. Meanwhile, as illustrated in FIG. 4, a housing 170 can be in a square pillar shape, and the heat exchanger 150 can be disposed on each side of the housing 170 adjacent to the condensation plate 140. In case the electrolyte bath 110 is in a square pillar shape, the electrolyte bath 110 can be disposed in a direction of certain way so that the connection terminal 112 can be easily in contact with a control unit of the housing 170 when replacing the electrolyte bath 110. Meanwhile, as illustrated in FIG. 5, the housing 170 can be in a circular pillar shape, and the heat exchanger 150 can be dispoesd on the outside surface of the housing 170 adjacent to the condensation plate 140. As a result, the efficacy of heat exchange of the condensation plate 140 can be increased, and thus the moisture carried in the hydrogen can be effectively condensed. A absorption layer 155 can be disposed on the transfer path of the hydrogen such that any remaining moisture carried in the hydrogen is absorbed. Generally, the moisture carried in the hydrogen can be separated from the hydrogen by passing the hydrogen through the condensation plate 140, but there may be still some remaining moisture after passing the hydrogen through the condensation plates 140. Therefore, the absorption layer 155 can be used for removing the remaining moisture.

In other words, the absorption layer 155 can be disposed on the top of the condensation plate 140 such that the remaining moisture carried in the hydrogen having been passed through the condensation plate 140 is removed. Therefore, the hydrogen becomes more dried and is supplied to a hydrogen chargeable device demanding hydrogen of low temperature and humidity or a fuel cell having the dead end stack structure that has a dead end fuel supply channel. Among them described above, the fuel cell will be described in an embodiment of a fuel cell generation system below.

Next, a fuel cell generation system according to another aspect of the present invention will be described.

Figure 6:
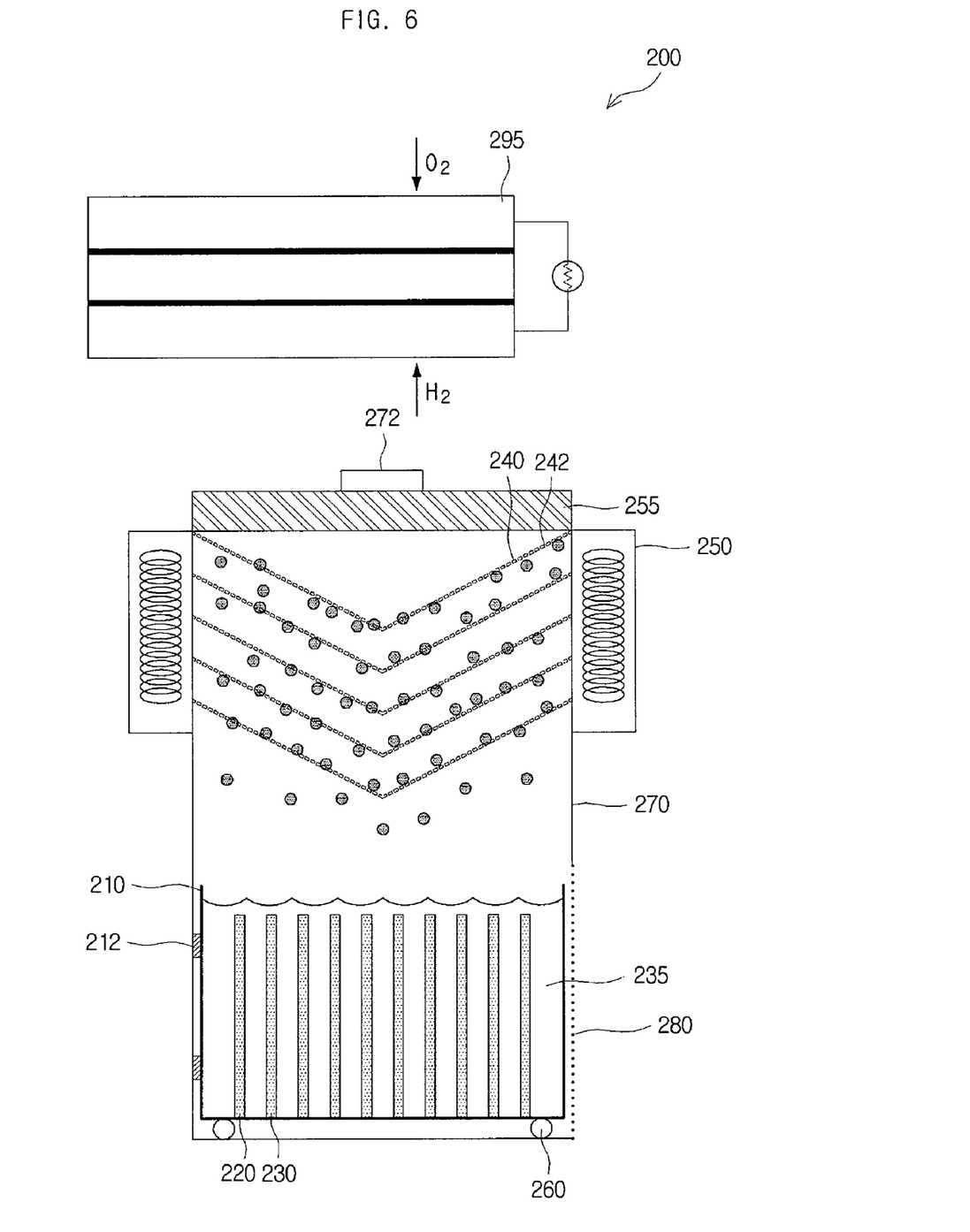
FIG. 6 is a diagram illustrating a fuel cell generation system according to another aspect of the present invention.

FIG. 6 is a diagram illustrating a fuel cell generation system according to another aspect of the present invention. Illustrated in FIG. 6 are a fuel cell generation system 200, an electrolyte bath 210, a connection terminal 212, an anode 220, a cathode 230, an electrolyte solution 235, a condensation plate 240, a through-hole 242, a heat exchanger 250, an absorption layer 255, a wheel 260, a housing 270, a hydrogen outlet 272, a cover 280, and a fuel cell 295.

This embodiment presents a fuel cell generation system 200, which improves the efficiency of generating electrical energy and operates steadily sincemoisture carried in hydrogen is removed while generating the hydrogen and circulated through the electrolyte bath 210. In this embodiment, the construction and operation of the electrolyte bath 210, connection-terminal 212, anode 220, cathode 230, electrolyte solution 235, condensation plate 240, air-hole 242, heat exchanger 250, wheel 160, housing 270, hydrogen outlet 272 and cover 280 are substantially the same as or similar to those of the embodiment described above and thus will not be described again. The descriptions hereinafter will focus on the fuel cell 295, which forms the differences from the previously described embodiment.

The fuel cell 295 can convert the chemical energy of the hydrogen generated at the cathode 230 to produce electrical energy. That is, the pure hydrogen generated in a hydrogen generating apparatus equipped with a condensation plate 240 and absorption layer 255 can travel to a fuel electrode of the fuel cell 295, and the chemical energy of the hydrogen generated at the hydrogen generating apparatus 200 described above can be converted to electrical energy to produce a direct current.

Here, the fuel cell 295 can have a dead end stack structure where the exit of a fuel supply channel is closed. That is, the hydrogen generated in the hydrogen generating apparatus can be the hydrogen of low humidity in which moisture carried in the hydrogen is removed while generating the hydrogen. Consequently, although the exit of the fuel supply channel is blocked, electrical energy can be effectively produced without a breakdown or a malfunction.

The hydrogen generating apparatus according to an embodiment of the present invention can increase the efficacy of hydrogen generation by removing the moisture carried in the hydrogen while generating the hydrogen and reusing the moisture circulated through the electrolyte solution.

Also, according to an embodiment of the present invention, the fuel cell generation system can increase the efficiency of electrical energy generation since the moisture carried in the hydrogen is removed and circulated through the electrolyte solution.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A hydrogen generating apparatus comprising:
an electrolyte bath configured to contain an electrolyte solution;
an anode placed inside the electrolyte bath and configured to generate electrons;
a cathode placed inside the electrolyte bath and configured to receive the electrons from the anode to generate hydrogen;
a condensation plate disposed on a transfer path of the hydrogen such that moisture carried in the hydrogen is condensed and the hydrogen is separated; and
a heat exchanger configured to cool down the condensation plate heated by the moisture carried in the hydrogen.

2. The hydrogen generating apparatus of claim 1, wherein the condensation plate is disposed such that the hydrogen is blocked, and a through-hole is formed on the condensation plate such that the hydrogen passes through the through-hole.

3. The hydrogen generating apparatus of claim 2, wherein the condensation plate has a porous structure.

4. The hydrogen generating apparatus of claim 1, wherein the condensation plate is disposed such that the condensed moisture is circulated through the electrolyte bath.

5. The hydrogen generating apparatus of claim 4, wherein the condensation plate is disposed with an inclination such that the condensed moisture flows down to the electrolyte bath.

6. The hydrogen generating apparatus of claim 5, wherein the condensation plate is disposed with an inclination to a center from both sides of the condensation plate such that the condensed moisture flows down to a center of the electrolyte bath.

7. The hydrogen generating apparatus of claim 1, wherein a plurality of condensation plates are disposed.

8. The hydrogen generating apparatus of claim 7, wherein the plurality of condensation plates have different thicknesses from one another and are disposed such that the condensation plates are thinner along the transfer path of the hydrogen.

9. The hydrogen generating apparatus of claim 7, wherein the plurality of condensation plates are disposed such that the hydrogen is blocked, and a through-hole is formed on each of the condensation plates such that the hydrogen passes through the condensation plates.

10. The hydrogen generating apparatus of claim 9, wherein the size of the through-hole on each of the plurality of condensation plates is different from one another, and the condensation plates are disposed such that the size of the through-hole on each of the plurality of condensation plates becomes smaller along the transfer path of the hydrogen.

11. The hydrogen generating apparatus of claim 1, wherein a surface of the condensation plate is coated with moisture repellent.

12. The hydrogen generating apparatus of claim 1, wherein the condensation plate is made of a material comprising a thermal conduction substance.

13. The hydrogen generating apparatus of claim 12, wherein the condensation plate is made of a material including at least one selected from a group consisting of carbon (C), copper (Cu), and aluminum (Al).

14. The hydrogen generating apparatus of claim 1, further comprising an absorption layer disposed after the condensation plate along the transfer path of the hydrogen such that remaining moisture carried in the hydrogen is absorbed.

15. The hydrogen generating apparatus of claim 1, further comprising a wheel coupled to the electrolyte bath such that the electrolyte bath is easily moved, the wheel being capable of being rolled.

16. A fuel cell power generation system comprising:
an electrolyte bath configured to contain an electrolyte solution;
an anode placed inside the electrolyte bath and configured to generate electrons;
a cathode placed inside the electrolyte bath and configured to receive the electrons from the anode to generate hydrogen;
a condensation plate disposed on a transfer path of the hydrogen such that moisture carried in the hydrogen is condensed and the hydrogen is separated;
a heat exchanger configured to cool down the condensation plate heated by the moisture carried in the hydrogen; and
a fuel cell configured to produce electrical energy by converting chemical energy of the hydrogen produced at the cathode.

17. The fuel cell power generation system of claim 16, wherein the condensation plate is disposed such that the hydrogen is blocked, and a through-hole is formed on the condensation plate such that the hydrogen passes through the through-hole.

18. The fuel cell power generation system of claim 17, wherein the condensation plate has a porous structure.

19. The fuel cell power generation system of claim 16, wherein the condensation plate is disposed such that the condensed moisture is circulated through the electrolyte bath.

20. The fuel cell power generation system of claim 19, wherein the condensation plate is disposed with an inclination such that the condensed moisture flows down to the electrolyte bath.

21. The fuel cell power generation system of claim 20, wherein the condensation plate is disposed with an inclination to a center from both sides of the condensation plate such that the condensed moisture flows down to a center of the electrolyte bath.

22. The fuel cell power generation system of claim 16, wherein a plurality of condensation plates are disposed.

23. The fuel cell power generation system of claim 22, wherein the plurality of condensation plates have different thicknesses from one another and are disposed such that the condensation plates are thinner along the transfer path of the hydrogen.

24. The fuel cell power generation system of claim 22, wherein the plurality of condensation plates are disposed such that the hydrogen is blocked, and a through-hole is formed on each of the condensation plates such that the hydrogen passes through the condensation plates.

25. The fuel cell power generation system of claim 24, wherein the size of the through-hole on each of the plurality of condensation plates is different from one another, and the condensation plates are disposed such that the size of the through-hole on each of the plurality of condensation plates becomes smaller along the transfer path of the hydrogen.

26. The fuel cell power generation system of claim 16, wherein a surface of the condensation plate is coated with moisture repellent.

27. The fuel cell power generation system of claim 16, wherein the condensation plate is made of a material comprising a thermal conduction substance.

28. The fuel cell power generation system of claim 27, wherein the condensation plate is made of a material including at least one selected from a group consisting of carbon (C), copper (Cu), and aluminum (Al).

29. The fuel cell power generation system of claim 16, further comprising an absorption layer disposed after the condensation plate along the transfer path of the hydrogen such that remaining moisture carried in the hydrogen is absorbed.

30. The fuel cell power generation system of claim 16, further comprising a wheel coupled to the electrolyte bath such that the electrolyte bath is easily moved, the wheel being capable of being rolled.

* * * * *